United States Patent [19]

Serini et al.

[11] Patent Number: 5,034,457
[45] Date of Patent: Jul. 23, 1991

[54] THERMOPLASTIC BLENDS CONTAINING POLYCARBONATES BASED ON SUBSTITUTED CYCLOHEXYLIDENEBISPHENOLS

[75] Inventors: Volker Serini; Dieter Freitag; Karsten Idel, all of Krefeld; Ulrich Grigo, Kempen, all of Fed. Rep. of Germany

[73] Assignee: Bayer Aktiengesellschaft, Bayerwerk, Fed. Rep. of Germany

[21] Appl. No.: 489,399

[22] Filed: Mar. 6, 1990

[30] Foreign Application Priority Data

Mar. 11, 1989 [DE] Fed. Rep. of Germany ....... 3908002
Aug. 11, 1989 [DE] Fed. Rep. of Germany ....... 3926613

[51] Int. Cl.$^5$ .................... C08G 64/06; C08L 69/00
[52] U.S. Cl. .................... 525/67; 525/92; 525/146; 525/147; 525/433; 525/439; 525/453; 525/462; 525/464; 525/469; 528/196; 528/204
[58] Field of Search ................ 528/196, 204; 525/67, 525/92, 146, 147, 433, 439, 453, 462, 464, 469

[56] References Cited

FOREIGN PATENT DOCUMENTS 062039 3/1986 Japan.
062040 3/1986 Japan.
105550 5/1986 Japan.

Primary Examiner—John C. Bleutge
Assistant Examiner—David Buttner
Attorney, Agent, or Firm—Joseph C. Gil; Richard E. L. Henderson

[57] ABSTRACT

Thermoplastic blends of
A) 1 to 99% by weight of at least one thermoplastic aromatic polycarbonate which contains difunctional carbonate structural units of the formula (I)

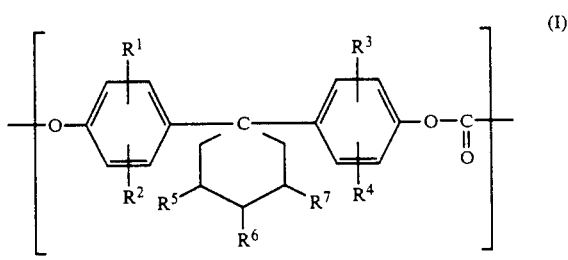

in which $R^1$, $R^2$, $R^3$ and $R^4$ independently of one another are hydrogen, a $C_1$–$C_{12}$-hydrocarbon radical or halogen and $R^5$, $R^6$ and $R^7$ independently of one another are H or a hydrocarbon radical, with the proviso that at least one of the radicals $R^5$, $R^6$ and $R^7$ is a hydrocarbon radical, that when only one of the radicals $R^5$, $R^6$ or $R^7$ is present as a hydrocarbon radical this is a $C_3$–$C_{12}$-hydrocarbon radical with the exception of $C_3$–$C_{12}$-n-alkyl, and that when two or three radicals $R^5$, $R^6$ and $R^7$ are present as hydrocarbon radicals these are any $C_1$–$C_{12}$-hydrocarbon radicals, in amounts of 100 to 1 mol %, relative to the total amount of difunctional carbonate structural units in the polycarbonate, 1 to 99% of another polymer.

1 Claim, No Drawings

THERMOPLASTIC BLENDS CONTAINING POLYCARBONATES BASED ON SUBSTITUTED CYCLOHEXYLIDENEBISPHENOLS

The invention relates to thermoplastic blends of

A) 1 to 99% by weight of at least one thermoplastic aromatic polycarbonate which contains difunctional carbonate structural units of the formula (I)

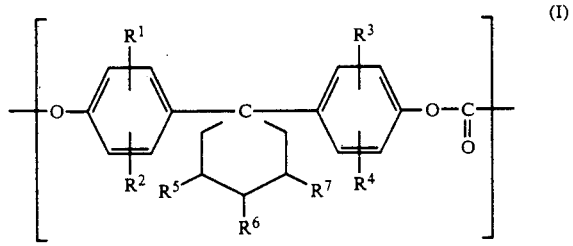

in which $R^1$, $R^2$, $R^3$ and $R^4$ independently of one another are hydrogen, a $C_1$–$C_{12}$-hydrocarbon radical or halogen and $R^5$, $R^6$ and $R^7$ independently of one another are H or a hydrocarbon radical, with the proviso that at least one of the radicals $R^5$, $R^6$ or $R^7$ is a hydrocarbon radical, that when only one of the radicals $R^5$, $R^6$ or $R^7$ is present as a hydrocarbon radical this is a $C_3$–$C_{12}$-hydrocarbon radical with the exception of $C_3$–$C_{12}$-n-alkyl, and that when two or three radicals $R^5$, $R^6$ and $R^7$ are present as hydrocarbon radicals these are any $C_1$–$C_{12}$-hydrocarbon radicals, in amounts of 100 to 1 mol %, relative to the total amount of difunctional carbonate structural units in the polycarbonate, B) 0 to 99% by weight of at least one amorphous thermoplastic which differs from (A) and has a glass transition temperature of 40° to 300° C., with the exception of aromatic polycarbonates, C) 0 to 99% by weight of at least one partly crystalline thermoplastic having a melting point of 60° to 400° C., D) 0 to 99% by weight of at least one rubber and E) 0 to 99% by weight of at least one graft polymer of at least one rubber with at least one grafted polymer of at least one monomer from the group consisting of the vinyl compounds, acrylate compounds and methacrylate compounds and maleic acid derivatives, in which the sum of A), B), C), D) and E) is 100% by weight.

The blends according to the invention, containing polycarbonates (A) based on substituted cyclohexylidenebisphenols, have important advantages over previously known alloys containing polycarbonates. They simultaneously have high heat distortion resistance, good melt flow and high thermal stability even under the action of atmospheric oxygen. They have a particularly high structural viscosity, which is an important advantage for processing by injection moulding and by extrusion; injection moulded articles can easily be removed from the mould. Furthermore, the blends are very tough, have particularly high tracking resistance, are stable to hydrolysis and stable to UV and γ radiation. In addition, they have high gas permeability and high selectivity for gas separation, for example for the separation of carbon dioxide/oxygen mixtures.

The thermoplastic blends according to the invention contain preferably 5 to 98% by weight, particularly preferably 10 to 95% by weight and in particular 20 to 90% by weight, of at least one thermoplastic aromatic polycarbonate (A) having difunctional carbonate structural units of the formula (I). They contain preferably 0 to 90% by weight, particularly preferably 0 to 75% by weight and in particular 0 to 60% by weight, of at least one amorphous thermoplastic (B). They contain preferably 0 to 90% by weight, particularly preferably 0 to 75% by weight and in particular 0 to 60% by weight, of at least one partly crystalline thermoplastic (C). They contain preferably 0 to 90% by weight, particularly preferably 0 to 75% by weight and in particular 0–60% by weight, of at least one graft polymer (E). In addition, they contain preferably 0 to 80% by weight, particularly preferably 0 to 60% by weight, very particularly preferably 0 to 45% by weight and in particular 0 to 30% by weight, of at least one rubber (D).

In the thermoplastic blends according to the invention, the sum of the rubber (D) and the rubber component of the graft polymer (E) is preferably 0 to 80% by weight, particularly preferably 0 to 60% by weight, very particularly preferably 0 to 45% by weight and in particular 0 to 30% by weight.

The thermoplastic blends according to the invention preferably contain, in addition to at least one thermoplastic aromatic polycarbonate (A) having difunctional carbonate structural units of the formula (I), one or two further components from amongst B), C), D) and E).

Particularly preferred blends are thermoplastic blends of at least one thermoplastic polycarbonate (A) having difunctional carbonate structural units of the formula (I), and 1 to 99% by weight of at least one amorphous thermoplastic (B) or 1 to 99% by weight of at least one graft polymer (E). Particularly preferred blends are those consisting of the blend components A) and E).

Other particularly preferred blends are those consisting of at least one thermoplastic polycarbonate (A) having difunctional carbonate structural units of the formula (I), 1 to 98% by weight, preferably 20 to 75% by weight and particularly preferably 30 to 60% by weight, of at least one partly crystalline thermoplastic having a melting point of 60° to 400° C., and 1 to 98% by weight, preferably 10 to 35% by weight and particularly preferably 15 to 25% by weight, of at least one graft polymer of at least one rubber and at least one grafted polymer (E).

Particularly preferred blends are thermoplastic blends of at least one thermoplastic polycarbonate (A) having difunctional carbonate structural units of the formula (I), which contain 1 to 98% by weight, preferably 10 to 70% by weight, particularly preferably 20 to 60% by weight, of at least one amorphous thermoplastic (B) having a glass transition temperature of 40° to 300° C. and 1 to 98% by weight, preferably 10 to 80% by weight, particularly preferably 20 to 60% by weight, of at least one graft polymer of at least one rubber and at least one grafted polymer (E).

Other particularly preferred thermoplastic blends of at least one thermoplastic polycarbonate (A) having difunctional carbonate structural units of the formula (I) are those which contain 1 to 98% by weight, preferably 10 to 80% by weight, particularly preferably 20 to 70% by weight, of at least one amorphous thermoplastic (B) having a glass transition temperature of 40° to 300° C. and 1 to 60% by weight, preferably 1 to 20% by weight and particularly preferably 2 to 5% by weight, of at least one rubber (D).

The thermoplastic aromatic polycarbonates (A) used according to the invention contain preferably 100 to 10 mol %, particularly preferably 100 to 25 mol %, very particularly preferably 100 to 50 mol % and in particular 100 mol % of difunctional carbonate structural units of the formula (I), based on the total amount of difunctional carbonate structural units in the polycarbonate.

The amorphous thermoplastics (B) have a glass transition temperature of, preferably, 50° to 280° C., particularly preferably 60° to 250° C. and very particularly preferably 80° to 230° C.

The partly crystalline thermoplastics (C) have melting points of, preferably, 70° to 350° C., particularly preferably 80° to 320° C. and in particular 100° to 300° C.

The thermoplastic aromatic polycarbonates (A) used according to the invention generally have average molecular weights Mw (weight average) of at least 10,000, preferably from 10,000 to 250,000 and in particular from 15,000 to 80,000.

The carbonate structural units of the formula (I) are based on bisphenols of the formula (II)

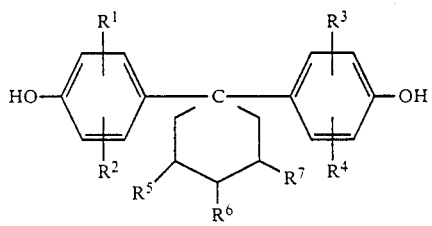

in which $R^1$, $R^2$, $R^3$, $R^4$, $R^5$, $R^6$ and $R^7$ have the same meaning as in formula (I).

In the formulae (I) and (II), $R^1$, $R^2$, $R^3$ and $R^4$ are preferably hydrogen, methyl, ethyl, phenyl, cyclohexyl, chlorine or bromine, but particularly preferably hydrogen, methyl or bromine.

If more than one of the radicals $R^1$, $R^2$, $R^3$ and $R^4$ are not hydrogen, identical substituents are preferred. If two of the radicals $R^1$, $R^2$, $R^3$ and $R^4$ are not hydrogen, o,o'-substitution, relative to the carbonate groups (formula (I)) or the phenolic OH groups (formula (II)), is preferred. If all four radicals $R^1$, $R^2$, $R^3$ and $R^4$ are not hydrogen, o,o,o',o'-substitution, relative to the above groups, is preferred.

In the formulae (I) and (II), the radicals $R^5$, $R^6$ and $R^7$ may denote $C_1$-$C_{12}$-hydrocarbon radicals. Such hydrocarbon radicals are, for example, n-alkyl radicals, such as, for example, methyl, ethyl, n-propyl, n-butyl, n-pentyl, n-hexyl, n-heptyl, n-octyl, n-nonyl, n-decyl, n-undecyl and n-dodecyl, and $C_3$-$C_{12}$-isoalkyl radicals, such as, for example, isopropyl, tert-butyl, 1-methylpropyl, 1,1-dimethylpropyl, 1-methylbutyl, 1,2-dimethylpropyl, 2,2-dimethylpropyl, isohexyl, isoheptyl, isooctyl (such as, for example, 1,1,3,3-tetramethylbutyl), isononyl (such as, for example, 3,5-dimethylheptyl), isodecyl, isoundecyl and isododecyl, as well as $C_6$-$C_{12}$-cycloalkyl, such as, for example cyclohexyl or cyclohexyl substituted by a n-alkyl or by isoalkyl (such as, for example, methyl-, ethyl-, isopropyl- or tert-butylcyclohexyl), aryl-substituted cyclohexyl (such as, for example, phenylcyclohexyl) and cyclohexyl with which phenyl radicals are used, aryl (such as, for example phenyl and naphthyl), aralkyl (such as, for example, benzyl and cumyl), alkaryl (such as, for example, methylphenyl and isopropylphenyl) and cycloalkyl-substituted alkyl (such as, for example, perhydrocumyl).

Preferred iso-$C_3$-$C_{12}$-alkyl radicals are isopropyl, tert-butyl, 1-methylpropyl, 1,1-dimethylpropyl and 1,1,3,3-tetramethylbutyl, particularly preferably tert-butyl, 1,1-dimethylpropyl and 1,1,3,3-tetramethylbutyl and very particularly preferably tert-butyl and 1,1,3,3-tetramethylbutyl.

Other preferred $C_1$-$C_{12}$-hydrocarbon radicals are methyl, ethyl, cycloalkyl, cyclohexyl-substituted alkyl, in particular cyclohexyl-substituted $C_1$-$C_3$-alkyl, aryl and aralkyl, in particular phenyl-substituted $C_1$-$C_3$-alkyl, particularly preferably methyl, cyclohexyl, phenyl, cumyl and perhydrocumyl and very particularly preferably methyl, cyclohexyl and phenyl, but in particular, methyl.

In formulae (I) and (II), n-alkyl radicals preferably represent $R^5$ and/or $R^7$ and iso-$C_3$-$C_{12}$-alkyl radicals and $C_6$-$C_{12}$-hydrocarbon radicals other than $C_6$-$C_{12}$-alkyl radicals preferably $R^6$ if it is important for the components to be readily obtainable. When a hydrocarbon radical and two hydrogens are present for the radicals $R^5$, $R^6$ and $R^7$ of formulae (I) and (II), the hydrocarbon radical preferably represents $R^7$ if the heat distortion resistance of the polycarbonate is important. When two hydrocarbons and one hydrogen are present for the radicals $R^5$, $R^6$ and $R^7$ of formulae (I) and (II), the two hydrocarbon radicals preferably represent $R^5$ and $R^7$ if the heat distortion resistance of the polycarbonate is important. Furthermore, the radicals $C_2$-$C_{12}$-n-alkyl and $C_6$-$C_{12}$-isoalkyl, where present, preferably represent the radical $R^6$ if $R^5$ and $R^6$ or $R^5$, $R^6$ and $R^7$ of formulae (I) and (II) are hydrocarbon radicals and the heat distortion resistance of the polycarbonates according to the invention is important.

Examples of bisphenols of the formula (II) are:
1,1-bis-(4-hydroxyphenyl)-3,4-dimethyl-cyclohexane
1,1-bis-(4-hydroxyphenyl)-3,5-dimethyl-cyclohexane
1,1-bis-(4-hydroxyphenyl)-3,4,5-trimethyl-cyclohexane
1,1-bis-(4-hydroxyphenyl)-3-methyl-5-ethyl-cyclohexane
1,1-bis-(4-hydroxyphenyl)-3-methyl-5-isopropyl-cyclohexane
1,1-bis-(4-hydroxyphenyl)-3,5-di-tert-butyl-cyclohexane
1,1-bis-(4-hydroxyphenyl)-3-methyl-5-tert-butyl-cyclohexane
1,1-bis-(4-hydroxyphenyl)-3-methyl-4-phenyl-cyclohexane
1,1-bis-(4-hydroxyphenyl)-3-methyl-4-cyclohexyl-cyclohexane
1,1-bis-(3-chloro-4-hydroxyphenyl)-3,5-dimethyl-cyclohexane
1,1-bis-(3,5-dimethyl-4-hydroxyphenyl)-3,5-dimethyl-cyclohexane
1,1-bis-(3,5-dimethyl-4-hydroxyphenyl)-3,4-dimethyl-cyclohexane
1,1-bis-(3,5-dichloro-4-hydroxyphenyl)-3,5-dimethyl-cyclohexane
1,1-bis-(3,5-dichloro-4-hydroxyphenyl)-3,4-dimethyl-cyclohexane
1,1-bis-(3,5-dibromo-4-hydroxyphenyl)-3,5-dimethyl-cyclohexane
1,1-bis-(3,5-dibromo-4-hydroxyphenyl)-3,4-dimethyl-cyclohexane
1,1-bis-(4-hydroxyphenyl)-4-isopropyl-cyclohexane
1,1-bis-(4-hydroxyphenyl)-4-tert-butyl-cyclohexane 1,1-bis-(4-hydroxyphenyl)-4-(1-methylpropyl)-cyclohexane
1,1-bis-(4-hydroxyphenyl)-4-(1,1-dimethylpropyl)-cyclohexane
1,1-bis-(4-hydroxyphenyl)-3-isopropyl-cyclohexane
1,1-bis-(4-hydroxyphenyl)-3-tert-butyl-cyclohexane
1,1-bis-(4-hydroxyphenyl)-3-(1-methylpropyl)-cyclohexane
1,1-bis-(4-hydroxyphenyl)-3-(1,1-dimethylpropane)-cyclohexane
1,1-bis-(3-methyl-4-hydroxyphenyl)-4-tert-butyl-cyclohexane
1,1-bis-(3-methyl-4-hydroxyphenyl)-4-(1,1-dimethylpropyl)-cyclohexane
1,1-bis-(3-chloro-4-hydroxyphenyl)-4-tert-butyl-cyclohexane
1,1-bis-(3,5-dimethyl-4-hydroxyphenyl)-4-tert-butyl-cyclohexane
1,1-bis-(3,5-dimethyl-4-hydroxyphenyl)-4-(1,1-dimethyl-propyl)-cyclohexane
1,1-bis-(3,5-dimethyl-4-hydroxyphenyl)-3-isopropyl-cyclohexane
1,1-bis-(3,5-dimethyl-4-hydroxyphenyl)-3-tert-butyl-cyclohexane
1,1-bis-(3,5-dichloro-4-hydroxyphenyl)-4-tert-butyl-cyclohexane
1,1-bis-(3,5-dichloro-4-hydroxyphenyl)-4-(1,1-dimethylpropyl)-cyclohexane
1,1-bis-(3,5-dichloro-4-hydroxyphenyl)-4-isopropyl-cyclohexane
1,1-bis-(3,5-dichloro-4-hydroxyphenyl)-4-(1-methylpropyl)-cyclohexane
1,1-bis-(3,5-dichloro-4-hydroxyphenyl)-3-isopropyl-cyclohexane
1,1-bis-(3,5-dibromo-4-hydroxyphenyl)-4-tert-butyl-cyclohexane
1,1-bis-(3,5-dibromo-4-hydroxyphenyl)-4-(1,1-dimethyl-propyl)-cyclohexane
1,1-bis-(3,5-dibromo-4-hydroxyphenyl)-4-isopropyl-cyclohexane
1,1-bis-(3,5-dibromo-4-hydroxyphenyl)-4-(1-methylpropyl)-cyclohexane
1,1-bis-(3,5-dibromo-4-hydroxyphenyl)-3-isopropyl-cyclohexane
1,1-bis-(3,5-dibromo-4-hydroxyphenyl)-3-tert-butyl-cyclohexane
1,1-bis-(4-hydroxyphenyl)-4-(1,1,3,3-tetramethylbutyl)-cyclohexane
1,1-bis-(4-hydroxyphenyl)-4-phenyl-cyclohexane
1,1-bis-(4-hydroxyphenyl)-4-cumyl-cyclohexane
1,1-bis-(4-hydroxyphenyl)-4-benzyl-cyclohexane
1,1-bis-(4-hydroxyphenyl)-4-cyclohexyl-cyclohexane
1,1-bis-(4-hydroxyphenyl)-4-perhydrocumyl-cyclohexane
1,1-bis-(4-hydroxyphenyl)-3-phenyl-cyclohexane
1,1-bis-(3-methyl-4-hydroxyphenyl)-4-(1,1,3,3-tetramethylbutyl)-cyclohexane
1,1-bis-(3-methyl-4-hydroxyphenyl)-4-phenyl-cyclohexane
1,1-bis-(3-methyl-4-hydroxyphenyl)-4-cumyl-cyclohexane
1,1-bis-(3-methyl-4-hydroxyphenyl)-4-cyclohexyl-cyclohexane
1,1-bis-(3,5-dimethyl-4-hydroxyphenyl)-4-(1,1,3,3-tetramethylbutyl)-cyclohexane
1,1-bis-(3,5-dimethyl-4-hydroxyphenyl)-4-phenyl-cyclohexane
1,1-bis-(3,5-dimethyl-4-hydroxyphenyl)-4-cumyl-cyclohexane
1,1-bis-(3,5-dimethyl-4-hydroxyphenyl)-4-cyclohexyl-cyclohexane
1,1-bis-(3-chloro-4-hydroxyphenyl)-4-(1,1,3,3-tetramethylbutyl)-cyclohexane
1,1-bis-(3,5-dichloro-4-hydroxyphenyl)-4-phenyl-cyclohexane
1,1-bis-(3,5-dichloro-4-hydroxypenyl)-4-cumyl-cyclohexane
1,1-bis-(3,5-dichloro-4-hydroxyphenyl)-4-cyclohexyl-cyclohexane
1,1-bis-(3,5-dibromo-4-hydroxyphenyl)-4-(1,1,3,3-tetramethylbutyl)-cyclohexane
1,1-bis-(3,5-dibromo-4-hydroxyphenyl)-4-phenyl-cyclohexane
1,1-bis-(3,5-dibromo-4-hydroxyphenyl)-4-cumyl-cyclohexane
1,1-bis-(3,5-dibromo-4-hydroxyphenyl)-1-cyclohexyl-cyclohexane
1,1-bis-(3,5-dibromo-4-hydroxyphenyl)-4-perhydrocumyl-cyclohexane Examples of preferred bisphenols are:
1,1-bis-(4-hydroxyphenyl)-4-tert-butylcyclohexane
1,1-bis-(4-hydroxyphenyl)-3,5-dimethyl-cyclohexane
1,1-bis-(4-hydroxyphenyl)-4-(1,1,3,3-tetramethylbutyl)-cyclohexane
1,1-bis-(4-hydroxyphenyl)-4-phenyl-cyclohexane
1,1-bis-(4-hydroxyphenyl)-4-cyclohexyl-cyclohexane
1,1-bis-(4-hydroxyphenyl)-4-cumyl-cyclohexane
1,1-bis-(4-hydroxyphenyl)-3,5-di-tert-butyl-cyclohexane
1,1-bis-(4-hydroxyphenyl)-3-methyl-5-tert-butyl-cyclohexane
1,1-bis-(4-hydroxyphenyl)-3-tert-butyl-cyclohexane Particularly preferred bisphenols are:
1,1-bis-(4-hydroxyphenyl)-3-tert-butyl-cyclohexane
1,1-bis-(4-hydroxyphenyl)-4-tert-butyl-cyclohexane
1,1-bis-(4-hydroxyphenyl)-3,5-dimethyl-cyclohexane
1,1-bis-(4-hydroxyphenyl)-4-(1,1,3,3-tetramethylbutyl)-cyclohexane
1,1-bis-(4-hydroxyphenyl)-3,5-di-tert-butyl-cyclohexane Bisphenols of the formula (II) are known or can be prepared by customary processes from corresponding ketones and phenols.

The polycarbonates according to the invention contain, in addition to the carbonate structural units of the formula (I), amounts complementary to 100 mol % of other difunctional carbonate structural units, for example those of the formula (III), which are based on bisphenols of the formula (IV),

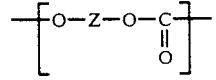 (III)

Bisphenols of the formula (IV) are those in which Z is an aromatic radical having 6 to 30 C atoms, which may contain one or more aromatic nuclei, may be substituted and may contain aliphatic radicals or cycloaliphatic radicals other than those of the formula (II) or heteroatoms as bridge members.

Examples of diphenols of the formula (IV) are
hydroquinone,
resorcinol, dihydroxybiphenyls,
bis-(hydroxyphenyl)-alkanes,
bis-(hydroxyphenyl)-cycloalkanes,
bis-(hydroxyphenyl) sulphides,
bis-(hydroxyphenyl) ethers,
bis-(hydroxyphenyl) ketones,
bis-(hydroxyphenyl) sulphones
bis-(hydroxyphenyl) sulphoxides,
α, α'-bis-(hydroxyphenyl)-diisopropylbenzenes
and their compounds which are alkylated in the nucleus and halogenated in the nucleus.

These and further suitable other diphenols are described, for example, in U.S. Pat. Nos. 3,028,365, 2,999,835, 3,148,172, 3,275,601, 2,991,273, 3,271,367, 3,062,781, 2,970,131 and 2,999,846, in German Offenlegungsschrift 1,570,703, 2,063,050, 2,063,052, 2,211,956, French Offenlegungsschrift 1,561,518 and in H. Schnell, "Chemistry and Physics of Polycarbonates", Interscience Publishers, New York 1964".

Examples of preferred other diphenols are:
4,4'-dihydroxybiphenyl,
2,2-bis-(4-hydroxyphenyl)-propane,
2,4-bis-(4-hydroxyphenyl)-2-methylbutane,
1,1-bis-(4-hydroxyphenyl)-cyclohexane,
α,α'-bis-(4-hydroxyphenyl)-p-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl) sulphone,
2,4-bis-(3,5-dimethyl-4-hydroxyphenyl)-2-methylbutane,
1,1-bis-(3,5-dimethyl-4-hydroxyphenyl)-cyclohexane,
α,α'-bis-(3,5-dimethyl-4-hydroxyphenyl)-p-diisopropylbenzene,
2,2-bis-(3,5-dichloro-4-hydroxyphenyl)-propane and
2,2-bis-(3,5-dibromo-4-hydroxyphenyl)-propane.

Examples of particularly preferred diphenols of the formula (IV) are:
2,2-bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)-propane and
1,1-bis-(4-hydroxyphenyl)-cyclohexane.

2,2-Bis-(4-hydroxyphenyl)-propane is particularly preferred.

The other diphenols can be used both individually and as a mixture.

Small amounts, preferably amounts between 0.05 and 2.0 mol % (relative to diphenols used) of compounds having a functionality of three or higher than three, in particular those having three or more than three phenolic hydroxyl groups, are used in a known manner as branching agents, where the latter are employed, in order to obtain branched polycarbonates. Some of the compounds which have three or more than three phenolic hydroxyl groups and may be used are
phloroglucinol,
4,6-dimethyl-2,4,6-tri-(4-hydroxyphenyl)-hept-2-ene,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis-(4,4-bis-(4-hydroxyphenyl)-cyclohexyl)-propane,
2,4-bis-(4-hydroxyphenyl-isopropyl)-phenol,
2,6-bis-(2-hydroxy-5'-methyl-benzyl)-4-methylphenol,
2-(4-hydroxyphenyl)-2-(2,4-dihydroxyphenyl)-propane,
hexa-(4-(4-hydroxyphenyl)-isopropyl)-phenyl) orthoterephthalate,
tetra-(4-hydroxyphenyl)-methane,
tetra-(4-(4-hydroxyphenyl-isopropyl)-phenoxy)-methane and
1,4-bis-((4',4''-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Monofunctional compounds in customary concentrations are used in a known manner as chain terminators for regulating the molecular weight. Examples of suitable compounds are secondary amines, phenols and acyl chlorides. Phenols, for example tert-butylphenols or other alkali-substituted phenols, are preferred. In particular, small amounts of phenols of the formula (V)

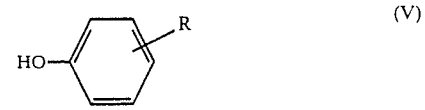

in which R represents a branched $C_8$- and/or $C_9$-alkyl radical, are suitable for regulating the molecular weight. In the alkyl radical R, the proportion of $CH_3$ protons is preferably between 47 and 89% and the proportion of CH and $CH_2$ protons is between 53 and 11%; furthermore, R is preferably in the o- and/or p-position with respect to the OH group, and the upper limit of the ortho proportion is particularly preferably 20%.

Some particularly suitable phenols are phenol, p-tert-butylphenol, hydroxybiphenyl, p-cumylphenol and in particular p-3,5-dimethylheptylphenol and m- and p-(1,1,3,3-tetramethylbutyl)-phenol. The chain terminators are used in general in amounts of 0.1 to 10, preferably 0.5 to 8, mol %, based on the diphenols used.

The polycarbonates according to the invention can preferably be prepared by the phase boundary process (cf. H. Schnell, "Chemistry and Physics of Polycarbonates", Polymer Reviews, Vol. IX, page 33 et seq., Interscience Publ., 1964) in a manner known per se. In this process, the diphenols of the formula (II) are dissolved in the aqueous alkaline phase. For the prepartion of copolycarbonates with other diphenols, mixtures of diphenols of the formula (II) and the other diphenols, for example those of the formula (IV), are used. To regulate the molecular weight, chain terminators, for example of the formula (V), may be added. Reaction with phosgene is then carried out in the presence of an inert organic phase which preferably dissolves polycarbonate, by the phase boundary condensation method. The reaction temperature is in general between 0° C. and 40° C.

The 0.05 to 2 mol % of branching agents which may optionally be used concomitantly can either be initially taken with the diphenols in the aqueous alkaline phase or dissolved in the organic solvent and added before the phosgenation.

In addition to the diphenols of the formula (II) to be used and the other diphenols of the formula (IV), their mono- and/or bis-chlorocarbonic esters may also be concomitantly used, these being added in solution in organic solvents. The amount of chain terminators and of branching agents depends on the number of moles of diphenolate structural units of (II) and, if appropriate, of the other diphenolate structural units, such as, for example, of (IV); furthermore, when chlorocarbonic esters are used, the amount of phosgene can be correspondingly reduced in a known manner.

For example, chlorinated hydrocarbons, such as chloroform, dichloroethane, di- and tetrachloroethylene, tetrachloroethane, methylene chloride, chlorobenzene and dichlorobenzene, as well as non-chlorinated hydrocarbons, such as, for example, toluene and xylene and mixtures of these solvents, in particular mixtures of methylene chloride and chlorobenzene, can be used as the organic phase for the phase boundary polycondensation and as organic solvents for dissolving the chain terminators and, if appropriate, for the branching agents and the chlorocarbonic esters. If appropriate, the chain extenders and branching agents used can be dissolved in the same solvent.

For example, methylene chloride, chlorobenzene or toluene and mixtures of methylene chloride and chlorobenzene are used as the organic phase for the phase boundary polycondensation.

The aqueous alkaline phase used is, for example, aqueous NaOH solution or KOH solution.

The preparation of the polycarbonates according to the invention by the phase boundary process can be catalysed in a customary manner by catalysts such as tertiary amines and phase-transfer catalysts, in particular tertiary aliphatic amines, such as, for example, tributylamine, triethylamine, N-ethylpiperidine and in particular quaternary ammonium and phosphonium compounds and crown ethers, such as, for example, tetrabuylammonium bromide and triphenylbenzylphosphoium bromide; the catalysts are generally used in amounts of 0.05 to 30 mol %, relative to moles of diphenols used. The catalysts are generally added before the beginning of the phosgenation or during or even after the phosgenation.

The polycarbonates according to the invention are isolated in a known manner, for example by separating off the organic phase obtained in the phase boundary process and containing the dissolved polycarbonate, washing the said phase neutral and electrolyte-free and then isolating the polycarbonate, for example as granules via a devolatilisation extruder, or by precipitation with the aid of a nonsolvent and subsequent drying, or as powder or as pellets by spray drying.

The high molecular weight, thermoplastic, aromatic polycarbonates according to the invention can also be prepared by the known process in the homogeneous phase, the so-called "pyridine process", and by the known melt transesterification process using, for example, diphenyl carbonate instead of phosgene. In this case too, the polycarbonates according to the invention are isolated in a known manner.

Examples of amorphous thermoplastics which can be used according to the invention as blend component (B) are aromatic polycarbonates without difunctional carbonate structural units of the formula (I), optionally with incoporated polysiliaxane blocks, incorporated aliphatic polyether blocks or incorporated aliphatic polyester blocks, aromatic polyesters, aromatic polyestercarbonates without difunctional carbonate structural units of the formula (I), aliphatic-aromatic polyesters, polyamides, polyarylene sulphones, aromatic polyethers, aromatic polyimides, polyepoxides, vinyl polymers and (meth)acrylate polymers.

Among these examples, the aromatic polyester carbonates without difunctional carbonate structural units of the formula (I), the aromatic polycarbonates without difunctional carbonate structural units of the formula (I) and with incorporated polysiloxane blocks, aromatic polyesters, aliphatic-aromatic polyesters, polyamides and vinyl polymers are preferably used, and the aromatic polyesters, aromatic polyester carbonates without difunctional carbonate structural units of the formula (I), the polyamides and the vinyl polymers are particularly preferably used.

According to the invention, aromatic polycarbonates without difunctional carbonate structural units of the formula (I) can be used as blend component (B). Such polycarbonates contain only difunctional carbonate structural units of the formula (III) which are based on bisphenols of the formula (IV). These may be homopolycarbonates of only one bisphenol or copolycarbonates of at least two bisphenols. The formulae (III) and (IV) are explained above. With regard to the molecular weight, branching agents, chain terminators and preparation process, the statements made for the polycarbonates (A) having carbonate structural units of the formula (I) are applicable to the polycarbonates. The bisphenols mentioned under formula (IV) as being preferred are also preferred here.

Other suitable blend components B) are polycarbonate/polysiloxane block copolymers in which the polycarbonate part is composed of at least one aromatic bisphenol of the formula (IV). The polysiloxane blocks can, for example, be incoporated in the polycarbonate/polysiloxane block copolymer by introducing polysiloxanes having terminal Cl or bisphenol groups into the polycarbonate reaction, for example by the two-phase boundary process. Such polysiloxanes are, for example, polydimethylsiloxanes of the formulae (VI) and (VII)

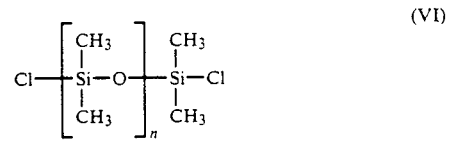
(VI)

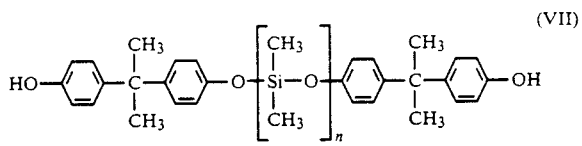
(VII)

having mean degrees of polycondensation n of 5 to 200. These and other suitable polysiloxane blocks have been frequently described in the literature. The siloxane content of the polycarbonate/polysiloxane block copolymers can be varied within wide limits, for example from 0.1 to 80% by weight, depending on the desired properties of the block copolymer. The preparation of suitable polysiloxane blocks which can be incorporated into the polycarbonate and the synthesis of polycarbonate/polysiloxane copolymers is described, for example, in: U.S. Pat. No. 3,189,662, German Patent Specification 1,595,790, German Patent Specification 2,411,123, German Offenlegungsschrift 3,411,263, EP-A-216 106 and German Offenlegungsschrift 3,506,472.

For example, polycarbonate-polyether block copolymers and polycarbonate/polyester block copolymers having aliphatic polyether blocks, for example polyethylene oxide, polypropylene oxide and preferably polybutylene oxide blocks, or having aliphatic polyester blocks, for example of hexanediol/adipic acid or hexanediol/dimeric fatty acid polyesters, can also be used as blend component B). Block copolymers of this type and their preparation are described in German Offenlegungsschrift 2,636,783, 2,636,784, 2,827,325, 2,726,376, 2,726,416, 2,726,417, 2,712,435 or 2,702,626.

Aromatic polyesters and polyester carbonates which can be used according to the invention as blend component (B) are composed of at least one aromatic bisphenol of the formula (VI), of at least one aromatic dicarboxylic acid and, if appropriate of carbonic acid. Suitable aromatic dicarboxylic acids are, for example, orthophthalic acid, terephthalic acid, isophthalic acid, tertbutylisophthalic acid, biphenyl-3,3'-dicarboxylic acid, biphenyl-4,4'-dicarboxylic acid, benzophenone-4,4'-dicarboxylic acid, benzophenone-3,4'-dicarboxylic acid, (diphenyl ether)-4,4'-dicarboxylic acid, (diphenyl sulphone)-4,4'-dicarboxylic acid, 2,2-bis-(4-carboxyphenyl)-propane and trimethyl-3-phenylindane-4',5-dicarboxylic acid.

Among the aromatic dicarboxylic acids, terephthalic acid and/or isophthalic acid are particularly preferably used. For the bisphenols, preferences stated under formula (IV) are applicable.

Aromatic polyesters and polyestercarbonates can be prepared by processes such as those known from the literature for the preparation of polyesters and polyestercarbonates, respectively, for example by processes in homogeneous solution, by melt esterification processes and by the two-phase boundary process. Melt transesterification processes and in particular the two-phase boundary process are preferably used.

Melt transesterification processes (acetate process and phenyl ester process) are described, for example, in U.S. Pat. Nos. 3,494,885, 4,386,186, 4,661,580, 4,680,371 and 4,680,372, EP-A-26 120, 26 121, 26 684, 28 030, 39 845, 91 602, 97 970, 79 075, 146 887, 156 103, 234 913, 234 919 and 240 301 and German Auslegeschrift 1,495,626 and 2,232,877. The two-phase boundary process is described, for example, in EP-A-68 014, 88 322, 134 898, 151 750, 182 189, 219 708 and 272 426, in German Offenlegungsschrift 2,940,024, 3,007,934 and 3,440,020 and in Polymer Reviews, Volume 10, Condensation of Polymers by Interfacial and Solution Methods, Paul W. Morgan, Interscience Publishers New York, 1965, Chapter VIII, page 325, Polyesters.

In the acetate process, in general bisphenol diacetate or bisphenol and acetic anhydride and an aromatic dicarboxylic acid are condensed with elimination of acetic acid to give the polyester. In the phenyl ester process, in general bisphenol, an aromatic dicarboxylic acid or a diphenyl ester of the aromatic dicarboxylic acid and, if appropriate, diphenyl carbonate are reacted with elimination of phenol and, where relevant, elimination of $CO_2$ to give the polyester or polyestercarbonate. In the two-phase boundary process, in general an alkali metal bisphenolate, an aromatic dicarboxylic acid dichloride and, if appropriate, phosgene are used as starting materials for the preparation of polyesters or polyestercarbonates. In this condensation reaction, the polyester and the polycarbonate are prepared with formation of alkali metal chloride. In general, the salt formed is present in solution in the aqueous phase, while the polyester formed or the polyestercarbonate formed is present in solution in the organic phase and is isolated therefrom.

Aliphatic-aromatic polyesters which can be used as blend component B) are, for example, amorphous polyesters of cyclohexane-1,4-dimethanol and terephthalic acid and/or isophthalic acid, which may also contain, as condensed comonomers, other dicarboxylic acids and aliphatic dihydroxy compounds, for example glycol, propylene glycol and butylene glycol. Examples of such polyesters are cyclohexane-1,4-dimethanol/terephthalic acid polyesters, cyclohexane-1,4-dimethanol/terephthalic acid/isophthalic acid copolyesters and cyclohexane-1,4-dimethanol/terephthalic acid/ethylene glycol copolyesters. Such polyesters are described, for example, in EP-A-273 151, 273 152, 155 989, 226 974, 185 309, 152 825, 226 189 and 272 416 and U.S. Pat. Nos. 4,188,314 and 4,634,737.

Amorphous thermoplastic polyamides which can be used as blend component B) are, for example, obtainable by polycondensation of diamines, such as ethylenediamine, tetramethylenediamine, hexamethylenediamine, decamethylenediamine, 2,2,4- and 2,4,4-trimethylhexamethylenediamine, m- and p-xylylenediamine, bis-(4-aminocyclohexyl)-methane, mixtures of 4,4'- and 2,2'-diaminodicyclohexylmethanes, 2,2-bis-(4-aminocyclohexane)-propane, 3,3'-dimethyl-4,4'-diaminodicyclohexylmethane, 3-aminoethyl-3,5,5-trimethylcyclohexylamine, 2,5-bis-(aminomethyl)-norbornane, 2,6-bis-(aminomethyl)-norbornane and 1,4-diaminomethylcyclohexane, and of any mixtures of these diamines with dicarboxylic acids, such as, for example, with oxalic acid, adipic acid, azelaic acid, decanedicarboxylic acid, heptadecanedicarboxylic acid, 2,2,4-trimethyladipic acid, 2,4,4-trimethyladipic acid, isophthalic acid and terephthalic acid, and with any mixtures of these dicarboxylic acids. Thus, amorphous copolyamides which are obtained by polycondensation of several of the above-mentioned diamines and/or dicarboxylic acids are also included. Amorphous copolyamides which are prepared with the concomitant use of ω-aminocarboxylic acids, such as ω-aminocaproic acid, ω-aminoundecanoic acid or ω-aminolauric acid, or of their lactams are also included.

Examples of suitable, amorphous, thermoplastic polyamides are those which are obtainable from isophthalic acid, hexamethylenediamine and further diamines, such as 4,4'-diaminodicyclohexylmethane, isophoronediamine, 2,2,4- and/or 2,4,4-trimethylhexamethylenediamine, 2,5- and/or 2,6-bis-(aminomethyl)-norbornane, those which are obtainable from isophthalic acid, 4,4'-diamino-dicyclohexylmethane and ω-caprolactam, those which are obtainable from isophthalic acid, 3,3'-dimethyl-4,4'-diamino-dicyclohexylmethane and ω-laurolactam, and those which are obtainable from terephthalic acid and 2,2,4- and/or 2,4,4-trimethylhexamethylenediamine.

Instead of the pure 4,4'-diaminodicyclohexylmethane, it is also possible to use mixtures of the diaminodicyclohexylmethane position isomers, which are composed of 70 to 99 mol % of the 4,4'-diamino isomer 1 to 30 mol % of the 2,4'-diamino isomer 0 to 2 mol % of the 2,2'-diamino isomer and, if appropriate, diamines which have an appropriately higher degree of condensation and are obtained by hydrogenation of technical grade diaminodiphenylmethane.

The amorphous polyamides and their preparation are known (see, for example, Ullmann, Encyklopadie der technischen Chemie [Encyclopaedia of Industrial Chemistry], Volume 19, page 50).

Polyarylene sulphones which can be used as blend component B) have in general average molecular weights Mw (weight average; measured by the light scattering method in CHCl₃) of 10,000 to 200,000, preferably of 20,000 to 90,000. Examples of these are the polyarylene sulphones obtainable by known processes from 4,4'-dichlorodiphenyl sulphone and at least one bisphenol, in particular 2,2-bis-(4-hydroxyphenyl)-propane and bis-(4-hydroxyphenyl)sulphone, which lead, for example, to polyarylene sulphones having difunctional sulphone structural units of the formulae (VIII) and (IX).

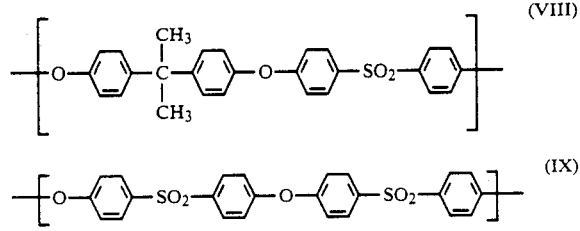

These polyarylene sulphones are known (see, for example, U.S. Pat. No. 3,264,536, German Auslegeschrift 1,794,171, British Patent Specification 1,264,900, U.S. Patent Specification 3,641,207, EP-A-00 38 028, German Offenlegungsschrift 3,601,419 and German Offenlegungsschrift 3,601,420, European Patent 149,359, European Patent 294,773 and the publications by G. Blinne et al., Kunststoffe [Plastics] 75/1 (1985) 29-34 and R. N. Johnson et al., Journal of Polymer Science, Part A1, 5 (1967) 2375-2398. The suitable polyarylene sulphones can also be branched in a known manner (see, for example, German Offenlegungsschrift 2,305,413).

Aromatic polyethers which can be used according to the invention as blend component B) are, for example, polyphenylene oxides. Polyphenylene oxides are known and are described, for example, in U.S. Pat. Nos. 3,306,874, 3,306,875, 3,257,357, 3,257,358, 3,661,848, 3,219,625, 3,378,505, 3,639,656, 4,011,200 and 3,929,930, EP-A-0 248 526 and 0 271 699 and German Offenlegungsschrift 2,126,434. The molecular weights Mw (weight average) are in general 10,000 to 80,000, preferably 15,000 to 60,000. Polyphenylene oxides are obtained as homo- or copolymers in general by an oxidative coupling reaction of one or more disubstituted or trisubstituted phenols. In general, a copper/amine complex is used as a catalyst for the reaction. Copper/amine complexes of primary, secondary and/or tertiary amines can be used. Examples of suitable homopolyphenylene oxides are:

poly-(2,3-dimethyl-6-ethyl-1,4-phenylene ether),
poly-(2,3,6-trimethyl-1,4-phenylene ether),
poly-(2,4'-methylphenyl-1,4-phenylene ether),
poly-(2-bromo-6-phenyl-1,4-phenylene ether),
poly-(2-methyl-6-phenyl-1,4-phenylene ether),
poly-(2-phenyl-1,4-phenylene ether),
poly-(2-chloro-1,4-phenylene ether),
poly-(2-methyl-1,4-phenylene ether),
poly-(2-chloro-6-ethyl-1,4-phenylene ether),
poly-(2-chloro-6-bromo-1,4-phenylene ether),
poly-(2,6-di-n-propyl-1,4-phenylene ether),
poly-(2-methyl-6-isopropyl-1,4-phenylene ether),
poly-(2-chloro-6-methyl-1,4-phenylene ether),
poly-(2-methyl-6-ethyl-1,4-phenylene ether),
poly-(2,6-dibromo-1,4-phenylene ether),
poly-(2,6-dichloro-1,4-phenylene ether),
poly-(2,6-diethyl-1,4-phenylene ether),
poly-(2,6-dimethyl-1,4-phenylene ether).

Suitable copolymeric polyphenylene oxides can be prepared, for example, from two or more phenols which are used for the preparation of the above-mentioned homopolyphenylene oxides. Poly-(2,6-dimethyl-1,4-phenylene ether) is particularly preferred. Graft and block copolymers of polyphenylene oxides and polyvinylaromatics, such as polystyrene, are also suitable as blend component B). Suitable styrene-grafted polyphenylene oxides are described, for example, in the publication "Xyron", Japan plastics age, March/April 1979, pages 29-33.

Aromatic polyimides which can be used as blend component B) are, for example, aromatic polyetherimides as described in U.S. Pat. Nos. 4,395,518 and 3,855,178, EP-A-120 183, 120 184, 179 471, 292, 243 and 278 066, German Patent Specification 2,735,501 and the publications Polyetherimid [Polyetherimide], Kunststoffe-Plastics 4/1982, pages 32-35, Polyetherimide [Polyetherimides], Kunststoffe [Plastics] 73/5 (1983), pages 266-269, R. O. Johnson and H. S. Burlhis, J. of Pol. Sc., Polymer Symp. 70 (1983) pages 129-143 and D. M. White et al., J. of Pol. Sc., Pol. Chemistry Ed., 19 (1981), pages 1635-1685. As described there, the synthesis of the polyetherimides can be carried out, for example, by reacting bisnitrobisphthalimides and alkali metal bisphenolates with elimination of alkali metal nitrite or by reacting bisetherbisphthalic anhydrides with diamines with elimination of water. A preferred aromatic polyetherimide is, for example, that consisting of repeating units of the formula (X)

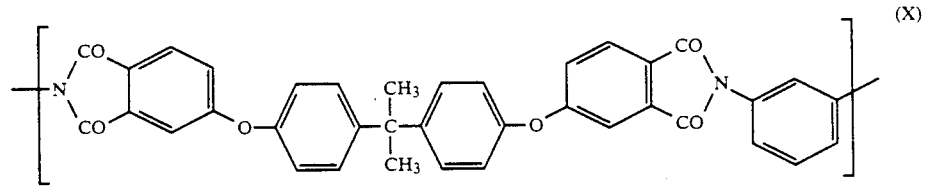

Polyepoxides which can be used as blend component B) are, for example, polyepoxides as can be prepared by epichlorohydrin and bisphenols, for example bisphenol A, by known methods. Formula (XI) shows a particularly preferred epoxide in which n can be, for example, 5 to 200.

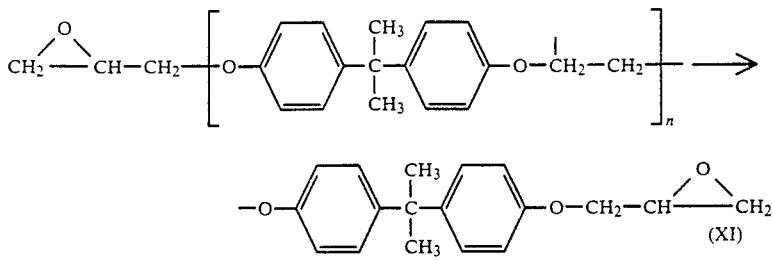

(XI)

Vinyl polymers and (meth)acrylic polymers, such as those which can be used as blend component B), are homo- and copolymers, for example of the following monomers:

1. Styrene and its derivatives, such as, for example, α-methylstyrene, α-chlorostyrene, p-chlorostyrene, 2,4-dichlorostyrene, p-methylstyrene, 3,4-dimethylstyrene, o- and p-divinylbenzene, p-methyl-α-methylstyrene and p-chloro-α-methylstyrene and p-chloro-α-methylstyrene, preferably styrene and α-methylstyrene.

2. Acrylic and methacrylic compounds, such as, for example, acrylic and methacrylic acid, acrylonitrile, methacrylonitrile, methyl acrylate, ethyl acrylate, n- and isopropyl acrylate, n- and isobutyl acrylate, tert-butyl acrylate, 2-ethylhexyl acrylate, methyl methacrylate, ethyl methacrylate, n- and isopropyl methacrylate, n- and isobutyl methacrylate, tert-butyl methacrylate, cyclohexyl methacrylate and isobornyl methacrylate, preferably acrylonitrile, methacrylonitrile, methyl methacrylate and tert-butyl methacrylate.

3. Maleic anhydride and its derivatives, such as maleic esters, maleic diesters and maleimides, for example, alkyl- and arylmaleimides, such as, for example, methyl- or phenylmaleimide, preferably maleic anhydride and maleimides, in particular phenylmaleimide.

The monomers of group 3 are used in general as comonomers for the monomers of groups 1 and 2.

Examples of suitable homo- and copolymers are polystyrene, polymethyl methacrylate, styrene/methylstyrene copolymers, styrene/acrylonitrile copolymers, α-methylstyrene/acrylonitrile copolymers, styrene/maleic anhydride copolymers, styrene/phenylmaleimide copolymers, styrene/methyl methacrylate copolymers, methyl methacrylate/acrylonitrile copolymers, styrene/acrylonitrile/maleic anhydride copolymers, styrene/acrylonitrile/phenylmaleimide copolymers, α-methylstyrene/acrylonitrile/methyl methacrylate copolymers, α-methylstyrene/acrylonitrile/tert-butyl methacrylate copolymers and styrene/acrylonitrile/tert-butyl methacrylate copolymers.

The vinyl polymers and (meth)acrylic polymers can be prepared by known free radical, anionic and cationic polymerization processes. The known redox polymerization or the known polymerization with organometallic mixed catalysts may also be advantageous. The polymerization can be carried out in the absence of a solvent, in solution or in emulsion, in a known manner.

Mixed processes, such as solution, precipitation or mass-suspension processes, can also be used, in the known manner. The weight average molecular weight of the vinyl polymers and (meth)acrylic polymers are in general 10,000 to 300,000, preferably 30,000 to 200,000.

Examples of partly crystalline thermoplastics which can be used according to the invention as blend component C) are polyolefins, ionomers, aliphatic-aromatic polyesters, polyamides, aromatic polyetherketones and polyphenylene sulphides. Aliphatic-aromatic polyesters and the polyamides are particularly preferred, particularly preferably the aliphatic-aromatic polyesters.

According to the invention, partly crystalline polyolefins can be used as blend component C). Such polyolefins are, for example, homo- and copolymers of olefinics, such as, for example, ethylene, propylene, but-1-ene, pent-1-ene, hex-1-ene, hept-1-ene, 3-methylbut-1-ene, 4-methylbut-1-ene, 4-methylpent-1-ene, oct-1-ene and others. A few such polyolefins are polyethylene, polypropylene, polybut-1-ene and poly-4-methylpent-1-ene. In the case of polyethylene, a distinction is made between PE, HDPE (high density), LDPE (low density) and LLDPE (very low density). The different densities of the polyethylene arise through different processes and cocondensation with other monomers, in the known manner. Known processes for the preparation of polyolefins are, for example, the high pressure process and the low pressure process (Ziegler-Natta catalysis with organometallic mixed catalysts).

Preferred blend components C) are polyethylene and poly-4-methylpent-1-ene, polyethylene being particularly preferred. The polyolefins can also contain minor amounts of other monomers in addition to the olefins.

According to the invention, ionomers are also suitable as blend component C). These are in general polyolefins, as described above, in particular polyethylene, which contain cocondensed monomers having acid groups, such as, for example, acrylic acid and methacrylic acid. The acid groups are converted with the aid of metal ions, such as, for example, $Na^+$, $Ca^{++}$, $Mg^{++}$ and $Al^{+++}$, into ionic, optionally ionically crosslinked, polyolefins, which however can still be processed by a thermoplastic method. Examples of such polymers are ethylene/acrylic acid copolymers whose acid groups have been converted into metal salt-like groups. Such ionomers are described, for example, in U.S. Pat. Nos. 3,264,272, 3,404,134, 3,355,319 and 4,321,337.

Aromatic-aliphatic polyesters which can be used as partly crystalline blend component C) are preferably polyalkylene terephthalates, that is to say, for example, those based on ethylene glycol, propane-1,3-diol, butane-1,4-diol, hexane-1,6-diol and 1,4-bishydroxymethylcyclohexane. Polybutylene terephthalates, polyethylene terephthalates and copolymers of cyclohexane-1,4-dimethanol and ethylene glycol and terephthalic acid are particularly preferably used, provided that they are partly crystalline. Polybutylene terephthalate is very particularly preferably used.

The molecular weights Mw (weight average) of these polyalkylene terephthalates are in general 10,000 to 200,000, preferably 10,000 to 80,000. The polyalkylene terephthalates can be obtained by transesterification by known processes, for example from dialkyl terephthalates and the corresponding diol (see, for example, U.S. Pat. Nos. 2,647,885, 2,643,989, 2,534,028, 2,578,660, 2,742,494 and 2,901,466).

Partly crystalline polyamides which are suitable as blend component C) are, in particular, polyamide 6, polyamide 6,6, polyamide 4,6 and partly crystalline copolyamides based on these components. Other suitable partly crystalline polyamides are those whose acid component consists, in particular, completely or partially (for example in addition to ε-caprolactam) of adipic acid and/or terephthalic acid and/or isophthalic acid and/or suberic acid and/or sebacic acid and/or azelaic acid and/or dodecanedicarboxylic acid and/or a cyclohexanedicarboxylic acid, and whose diamine component consists completely or partially of, in particular, m-and/or p-xylylenediamine and/or hexamethylenediamine and/or 2,2,4- and/or 2,4,4-trimethylhexamethylenediamine and/or isophoronediamine and whose compositions are known in principle from the prior art (see, for example, Encyclopedia of Polymers, Vol. 11, page 315 et seq.).

Partly crystalline polyamides which are prepared completely or partially from lactams having 6 to 12 C atoms, if appropriate with concomitant use of one or more of the above-mentioned starting components, are also suitable.

Particularly preferred partly crystalline polyamides are polyamide 6 and polyamide 6,6 or copolyamides having a small content, for example up to about 10 percent by weight, of other co-components.

Aromatic polyetherketones which are described, for example, in the Patent Specifications GB 1 078 234, U.S. Pat. No. 4,010,147, EP 135 938, 292 211, 275 035, 270 998 and 165 406 and JA 62 151 421 and in the publications by C. K. Sham et al., Polymer 29/6 (1988), pages 1016-1020, and J. E. Harris et al., J. Appl. Polym. Sc. 35/7 (1988), pages 1877-1891, can also be used as partly crystalline blend component C). These polyetherketones can be obtained, for example, by reacting bisphenols with bis-(halogenoaryl)-ketones in polar aprotic solvents in the presence of alkali metal carbonates. Thus, for example, polymers having difunctional structural units of the formula (XII) can be obtained by reacting hydroquinone with 4,4'-difluorobenzophenone, and polymers having difunctional structural units of the formula (XIII) can be obtained by reacting bis-(4-hydroxyphenyl) ketone with 4,4'-difluorobenzophenone.

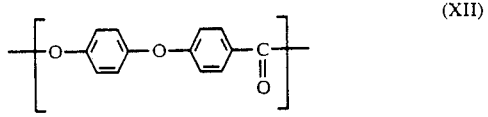

(XII)

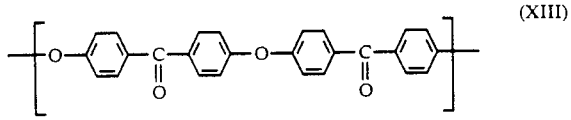

(XIII)

These polymers are polyetherketones which can be preferably used.

Other polymers which can be used as partly cyrstalline blend component C) are thermoplastic linear or branched polyarylene sulphides. They have structural units of the general formula (XIV)

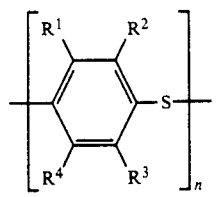

(XIV)

in which $R^1$ to $R^4$ independently of one another denote $C_1$-$C_6$-alkyl, phenyl or hydrogen. The polyarylene sulphides may also contain biphenyl units. The polyarylene sulphide in which $R^1$ to $R^4$ are H is the most important one.

Polyarylene sulphides and their preparation are known and are described, for example, in U.S. Pat. Nos. 3,354,129, 3,786,035, 3,853,824, 3,856,560 and 3,862,095 and EP-A-0 171 021 and in the publications by W. Baerecke, International Polymer Science and Technology, Vol. 1, No. 9, 1974, pages T/52-T/54, and A. S. Wood, Mod. Plast. Int. 18/4 (1988) pages 34-37.

Thermoplastic rubbers can be used as rubbers (D). Such thermoplastic rubbers are, for example, thermoplastic polyurethanes, polyetheresters, polyesteramides, polyetheramides, thermoplastic olefinic elastomers, ethylene/ethyl acrylate copolymers, styrene/butadiene segment polymers, styrene/isoprene segment polymers and hydrogenated styrene/butadiene segment polymers. Thermoplastic polyurethanes, polyetheresters and in particular hydrogenated styrene/butadiene segment polymers are preferably used.

Thermoplastic polyurethanes are prepared, for example, from three components, from long-chain bifunctional polyols, short-chain diols or diamines and diisocyanate. The reaction of the three components is carried out, for example, at starting temperatures of between 60° and 140° C. with vigorous stirring. During this procedure, the isocyanate groups react with the hydroxyl groups with formation of urethane groups, without elimination of byproducts. After comminution and storage for several days, the elastomer can be processed by a thermoplastic method. Suitable long-chain polyols are, for example, ethanediol polyadipate, butane-1,4-diol polyadipate, ethanediol butanediol polyadipate, hexane-1,6-diol neopentylglycol polyadipate, 1,2-propylene glycol polyether, tetramethylene oxide (=tetrahydrofuran polyether), hexane-1,6-diol polycarbonate and polycaprolactone.

Suitable short-chain diols or diamines (chain extenders) are, for example, ethanediol, butane-1,4-diol, hexane-1,6-diol, hydroquinone di-β-hydroxyethyl ether and isophoronediamine.

Suitable diisocyanates are, for example, 4,4'-diphenylmethane diisocyanate (MDI), hexamethylene diisocyanate (HDI), isophorone diisocyanate (IPDI) and 1,5-naphthylene diisocyanate (NDI).

The thermoplastic polyurethanes and their preparation are described in the publications by W. Goyert et al., Kunststoffe [Plastics] 68th Year 1978, pages 2-8, in the monograph by J. H. Saunders et al., Polyurethanes, Chemistry and Technology, Vol. II, pages 299-451, Interscience Publishers, New York, 1964, and in U.S. patent specifications Nos. 2,729,618 and 3,214,411.

Suitable polyetheresters are, for example, block copolymers of soft segments, such as polytetramethylene glycol terephthalate or polypropylene glycol terephthalate or polyethylene glycol terephthalate, and hard segments of polybutylene terephthalate, as described, for example, in J. W. Crary, GAK 7/1986, Year 39, pages 330–334, and G. K. Hoeschele, Chimica 28/9 (1974), pages 544–552.

Suitable polyesteramides and polyetheramides are described, for example, in EP-A-126 928, German Offenlegungsschrift 2,523,991, EP-A-281 461 and the publication Kunststoffe [Plastics] 72/5 (1982), pages 282–283. These are block copolymers of polyether segments, such as polyethylene glycol, polypropylene glycol and polybutylene glycol, and polyamide segments, such as PA 6, PA 6 6, PA 11, PA 12, PA 6 11 and PA 6 12.

Suitable styrene/butadiene, styrene/isoprene and hydrogenated styrene/butadiene segment polymers are described, for example, in U.S. Pat. Nos. 3,333,024, 3,753,936 and 3,281,383, German Patent Specification 2,819,493 and German Offenlegungsschrift 2,613,200 and 2,643,757. The SBS block copolymers and the hydrogenated SBS block copolymers (SEBS=styrene/ethylene/butylene/styrene block copolymers) are preferred.

Rubbers other than the above-mentioned thermoplastic rubbers can also be used as rubbers (D). Such rubbers are, for example, natural rubber, epichlorohydrin rubbers, ethylene/vinyl acetate rubbers, polyethylene chlorosulphone rubbers, silicone rubbers, polyether rubbers, diene rubbers, hydrogenated diene rubbers, polyalkenamer rubbers, acrylate rubbers, ethylene/propylene rubbers, ethylene/propylene/diene rubbers, butyl rubbers and fluorine rubbers. Silicone rubbers, diene rubbers, hydrogenated diene rubbers, acrylate rubbers and ethylene/propylene/diene rubbers (examples of dienes: dicyclopentadiene, ethylidenenorbornene or hexa-1,4-diene) are preferred.

Diene rubbers are, for example, homopolymers of conjugated dienes having 4 to 8 carbon atoms, such as butadiene, isoprene, piperylene and chloroprene, copolymers of such dienes with one another and copolymers of such dienes with styrene, acrylic or methacrylic compounds (for example acrylonitrile, methacrylonitrile, acrylic acid, methacrylic acid, butyl acrylate and methyl methacrylate).

Among the diene rubbers, butadiene, butadiene/styrene, butadiene/methyl methacrylate, butadiene/butyl acrylate and butadiene/acrylonitrile rubbers are particularly preferred. Acrylate rubbers are, for example, alkyl acrylate rubbers based on one or more $C_1$–$C_8$-alkyl acrylates, in particular on ethyl, butyl, octyl or 2-ethylhexyl acrylate. These alkyl acrylate rubbers may contain up to 30% by weight of monomers such as vinyl acetate, acrylonitrile, styrene, methyl methacrylate or vinyl ether in copolymerized form. These alkyl acrylate rubbers may furthermore contain small amounts (up to 5% by weight) of crosslinking polyfunctional monomers in copolymerized form. Examples are esters of unsaturated carboxylic acids with a polyol (preferably 2 to 20 carbon atoms in the ester group), such as ethylene glycol dimethacrylate; esters of a polybasic carboxylic acid with an unsaturated alcohol (preferably 8 to 30 carbon atoms in the ester radical), such as triallyl cyanurate or triallyl isocyanurate, divinyl compounds, such as divinylbenzene; esters of unsaturated carboxylic acids with unsaturated alcohols (preferably 6 to 12 carbon atoms in the ester radical), such as allyl methacrylate; phosphoric esters, for example triallyl phosphate, and 1,3,5-triacryloylhexahydro-s-triazine. Particularly preferred polyfunctional monomers are triallyl cyanurate, triallyl isocyanurate, triallyl phosphate and allyl methacrylate.

Other suitable acrylate rubbers are products which contain a crosslinked diene rubber of one or more conjugated dienes, such as polybutadiene, or a copolymer of a conjugated diene with an ethylenically unsaturated monomer, such as styrene and/or acrylonitrile, as a core, and an acrylate shell.

Suitable silicone rubbers can be, for example, crosslinked silicone rubbers of units of the general formulae $R_2SiO$, $RSiO_{3/2}$, $R_3SiO_{\frac{1}{2}}$ and $SiO_{2/4}$, in which R represents a monovalent radical. The amounts of the individual siloxane units are such that 0 to 10 molar units of the formula $RSiO_{3/2}$, 0 to 1.5 molar units of the formula $R_3SiO_{\frac{1}{2}}$ and 0 to 3 molar units of the formula $SiO_{2/4}$ are present per 100 units of the formula $R_2SiO$.

R can be either a monovalent saturated hydrocarbon radical having 1 to 18 carbon atoms, the phenyl radical or the alkoxy radical or a group which can be attacked by free radicals, such as the vinyl or the mercaptopropyl radical. Preferably, at least 80% of all radicals R are methyl; combinations of methyl and ethyl or methyl are particularly preferred.

Preferred silicone rubbers contain incorporated units of groups which can be attacked by free radicals, in particular vinyl, allyl, halogen or mercapto groups, preferably in amounts 2 to 10 mol %, relative to all radicals R.

They can be prepared, for example, as described in EP-A-260 558.

Graft polymers which are obtained by free radical polymerization of at least one of the monomers listed above in three groups, in the presence of at least one rubber (nonthermoplastic rubber) can be used as graft polymers E) in the blends according to the invention. Preferred preparation processes are emulsion, solution, mass or suspension polymerization. Thus, the graft copolymers can be produced, for example, by free radical emulsion graft polymerization of the vinylmonomers in the presence of rubber latices at temperatures of 50° to 90° C. using water-soluble initiators, such as peroxodisulphate, or with the aid of redox initiators.

Rubbers which already consist of preformed core-/shell rubber particles which consist of two different rubbers can also be used. Thus, for example, the core can consist of a polybutadiene rubber or of a silicone rubber and the shell can consist of an acrylate rubber (see above and, for example, European Patent 260,558, core/shell of silicone/acrylate). One or more grafted shells can be applied to the rubber particles by a single grafting procedure or repeated stepwise grafting, and each grafted shell can have a different composition. In addition to the monomers to be grafted, polyfunctional monomers which are crosslinking or contain reactive groups can also be grafted in order to achieve certain effects in the blend (see, for example EP-A-230 282, German Offenlegungsschrift 3,601,419 and EP-A-269 861).

The graft polymers E) contain in general 5 to 90% by weight, in particular 20 to 85% by weight, of rubber and 95 to 10% by weight, in particular 80 to 15% by weight, of graft-copolymerized monomers. In these graft copolymers, the rubbers are present in general in the form of at least partially crosslinked particles having a mean particle size of 0.05 to 5 μm, preferably 0.1 to 2 μm, in particular 0.1 to 1 μm.

The monomers and rubbers stated as being preferred or particularly preferred in the case of the vinyl polymers and (meth)acrylic polymers and in the case of the rubbers are also preferred or particularly preferred in the case of the graft polymers.

The polymer blends of this invention can be prepared in various ways. Thus, the starting polymers can be dissolved together in a solvent or in a solvent mixture. The polymer blend can be obtained by coprecipitation of the polymers by the addition of a nonsolvent or dropwise addition of the solution to a precipitation medium, and also by evaporating off the solvent.

Before all blend components are finally mixed, it is also possible to mix individual polymers of the final blend alone. Thus, for example, latices of a resin-like copolymer (for example styrene/acrylonitrile copolymer) and of a rubber (for example butadiene/acrylonitrile copolymer) can be mixed by coprecipitation before they are blended with the polycarbonate to give the final moulding material.

Blending of the starting polymers can, however, also be carried out via the melt in mixing apparatuses, such as, for example, extruders, internal kneaders and roll mills.

Customary additives can be added to the individual blend components during their preparation or after their preparation, even in the form of their solution or melt.

Customary additives can also be added to the blend during its preparation. Customary additives can also be added to the prepared blend, even in the form of its solution or melt.

Customary additives are, for example, stabilisers, nucleating agents, mould release agents, pigments, flameproofing agents, antistatic agents, conductivity additives, fillers, reinforcing substances and fibres in the customary amounts.

Specifically, for example, graphite, carbon black, metal fibres, metal powders, kieselguhr, talc, kaolin, mica, clays, $CaF_2$, $CaCO_3$, aluminas, aluminium nitride, silicates and barium sulphate can be used both as fillers and reinforcing substances and as nucleating agents, for example glycerol stearates, pentaerythritol tetrastearate and trimethylolpropane tristearate can be used as mould release agents, for example glass fibres and C fibres can be used as fibres and, for example, $TiO_2$, Fe oxides, carbon black and organic pigments can be used as pigments.

The blends according to the invention can be processed in a known manner, for example by injection moulding or by extrusion to give any mouldings, including sheets, films and fibres.

The sheets and films obtained can be subjected to deep drawing processes. The films can be laminated with other films to give laminated films. Furthermore, the blends according to the invention can also be used in other composite materials, for example in combination with fibres and other polymers.

Because of the above-mentioned properties, the mouldings produced from the blends according to the invention have advantages over previously known materials, in particular for structural components in the electrical and electronics sector, for large housing parts subjected to high loads, as bodywork parts and parts for the engine space in the automotive sector and for gas-permeable and gas-separating films.

EXAMPLE 1

Polycarbonate of 1,1-bis-(4-hydroxyphenyl)-4-tert-butylcyclohexane (PC-BP4B)

184 g (4.6 mol) of NaOH and 324 g (1 mol) of 1,1-bis-(4-hydroxyphenyl)-4-tert-butylcyclohexane were dissolved in 3 l of water. 3 l of methylene chloride containing 6.8 g (0.033 mol) of dissolved 4-(1,1,3,3-tetramethyl-butyl)-phenol were added. 148.5 g (1.5 mol) of phosgene were then passed into the mixture at 25° C. in the course of 30 minutes while stirring thoroughly. After the addition of 1.13 g (0.01 mol) of N-ethylpiperidine, the mixture was stirred thoroughly for 60 minutes at 25° C. The bisphenolate-free alkaline aqueous phase was separated off; the organic phase was acidified with dilute phosphoric acid and then washed electrolyte-free with water and evaporated down. The polycarbonate obtained was then freed from the residual methylene chloride by drying. It was colourless and had a relative viscosity $\eta rel = 1.313$ (measured in a methylene chloride solution, c=5 g/l, at 25° C.). The glass transition temperature Tg (according to differential thermal analysis) was 221° C.

EXAMPLE 2

Copolymer of bisphenol A and 1,1-bis-(4-hydroxyphenyl)-4-tert-butyl-cyclohexane in a molar ratio of 1:1 (PC-BP4B-BPA)

Example 1 was repeated, except that half the bisphenol used there was replaced by 114 g (0.5 mol) of 2,2-bis-(4-hydroxyphenyl)-propane (bisphenol A).

The polycarbonate obtained had a relative viscosity $\eta rel$ of 1.297 (measured in a methylene chloride solution at 25° C., c=5 g/l). The glass transition temperature Tg (according to differential thermal analysis) was 192° C.

EXAMPLE 3

Polycarbonate of 1,1-bis-(4-hydroxyphenyl)-3,5-dimethylcyclohexane (PC-BP35DM)

184 g (4.6 mol) of NaOH and 296 g (1 mol) of 1,1-bis-(4-hydroxyphenyl)-3,5-dimethyl-cyclohexane were dissolved in 3 l of water. 3 l of methylene chloride containing 7.2 g (0.035 mol) of dissolved 4-(1,1,3,3-tetramethyl)-butylphenol were added. 148.5 g (1.5 mol) of phosgene were passed into the mixture at 25° C. in the course of 30 minutes, while stirring thoroughly. After the addition of 1.13 g (0.01 mol) of N-ethylpiperidine, the mixture was stirred thoroughly for 60 minutes at 25° C.

The bisphenolate-free alkaline aqueous phase was separated off; the organic phase was acidified with dilute phosphoric acid and then washed electrolyte-free with water and evaporated down. The polycarbonate obtained was then freed from the residual methylene chloride by drying. It was colourless and had a relative viscosity $\eta rel$ of 1.304 (measured in dichloromethane at 25° C., c=5 g of polycarbonate/l of solution). The glass transition temperature Tg (according to differential thermal analysis) was 229° C.

EXAMPLE 4

Copolymer of bisphenol A and 1,1-bis-(4-hydroxyphenyl)-3,5-dimethyl-cyclohexane in a molar ratio of 1:1 (PC-BP35DM-BPA)

Example 1 was repeated, except that half the bisphenol used there was replaced by 114 g (0.5 mol) of 2,2-bis-(4-hydroxyphenyl)-propane (bisphenol A).

The polycarbonate obtained had a relative viscosity $\eta$rel of 1.301 (measured in dichloromethane at 25° C., c=5 g of polycarbonate/l of solution). The glass transition temperature Tg (according to differential thermal analysis) was 196° C.

EXAMPLE 5

Polycarbonate of 1,1-bis-(4-hydroxphenyl)-4-(1,1,3,3-tetramethylbutyl)-cyclohexane (PC-BP40)

184 g (4.6 mol) of NaOH and 380 g (1 mol) of 1,1-bis-(4-hydroxyphenyl)-4-(1,1,3,3-tetramethylbutyl)-cyclohexane were dissolved in 3 l of water. 3 l of methylene chloride containing 7.4 g (0.036 mol) of dissolved 4-(1,1,3,3-tetramethylbutyl)-phenol were added. 148.5 g (1.5 mol) of phosgene were then passed into the mixture at 25° C. in the course of 30 minutes while stirring thoroughly. After the addition of 1.13 g (0.01 mol) of N-ethylpiperidine, the mixture was stirred thoroughly for 60 minutes at 25° C. The bisphenolate-free alkaline aqueous phase was separated off; the organic phase was acidified with dilute phosphoric acid and then washed electrolyte-free with water and evaporated down. The polycarbonate obtained was then freed from the residual methylene chloride by drying. It was colourless and had a relative viscosity $\eta$rel=1.307 (measured in a methylene chloride solution, c=5 g/l, at 25° C.).

EXAMPLE 6

Further polymers used

1. PC-BPA

Polycarbonate of bisphenol A having terminal groups of 4-(1,1,3,3-tetramethyl-butyl)-phenol, $\eta$rel=1.302 (measured in $CH_2Cl_2$ solution, c=5 g/l, at 25° C.).

2. PCSI-BPA

Polysiloxane/polycarbonate block copolymer of bisphenol A and of 7% by weight of polydimethylsiloxane blocks containing terminal bisphenol A groups (relative to block copolymer), having a mean polydimethylsiloxane block length $\bar{P}_n$ of 70 dimethylsiloxane units, $\eta$rel=1.298 (measured as in Example 1), terminal polycarbonate group as in Example 1.

3. APEC 35

Aromatic polyester carbonate of 65% by weight of bisphenol A carbonate units and 35% by weight of bisphenol A terephthalate units, terminal groups as in Example 1, $\eta$rel=1.311 (measured as in Example 2).

4. PA-AM

Amorphous polyamide of hexamethylenediamine and isophthalic acid, $\eta$rel=2.42 (measured in m-cresol at 25° C., c=10 g/l of solution), Tg=123° C. (measured by differential thermal analysis).

5. PST

Polystyrene having a weight average molecular weight Mw of 170,000.

6. PBT

Polybutylene terephtalate, $\eta$rel=1.720 (in 1:1 parts by weight of phenol/o-dichlorobenzene at 25° C., c=5 g/l of solution)

7. PPS

Polyphenylene sulphide, preparation process according to European Patent 171,021, melt viscosity $\eta_m$=50 Pa.sec (measured at 306° C. and at a shear rate $\tau$=100 Pa in a plate-and-cone viscometer)

8. PUR

Thermoplastic polyurethane having a melting range of about 200° to 220° C. and a number average molecular weight ($M_n$) of 85,700, composed of an oligoester of 1,4-butylene glycol and adipic acid ($M_n$ 2,000), diphenylmethane 4,4-diisocyanate and butane-1,4-diol as a chain extender, ratio of NCO to OH groups 1.03.

9. SEBS

Partially hydrogenated polystyrene/polybutadiene/-polystyrene block copolymer (=polystyrene/polyethylene/polybutylene/polystyrene block copolymer), Kraton G 1651, commercial product from Shell AG.

10. PB-MMA

Graft polymer of 80% by weight of polybutadiene and 20% by weight of grafted methyl methacrylate, mean rubber particle size 0.4 μm.

11. AC-MMA

Graft polymer of 80% by weight of crosslinked butyl acrylate rubber and 20% by weight of grafted methyl methacrylate, mean rubber particle size 0.5 μm.

12. PB-SAN

Graft polymer of 50% by weight polybutadiene and 50% by weight of grafted styrene/acrylonitrile in a weight ratio of 72:28, mean rubber particle size 0.4 μm.

13. AC-SAN

Graft polymer of 60% by weight of a crosslinked butyl acrylate rubber and 40% by weight of grafted styrene/acrylonitrile, 72:28 parts by weight, mean rubber particle size 0.5 μm.

EXAMPLES 7-19

Properties of blends according to the invention are shown in Tables 1-3. The blends were mixed in the form of the melt in a twin-screw extruder at temperatures between 265° and 330° C., in each case at the lowest temperature at which good homogenisation of the blend components was still possible.

The polycarbonates of Examples 1-5 which were used for the blends were prepared in the manner described there, but on an appropriately larger scale. The $\eta$rel values of the polycarbonates used were between 1.295 and 1.315 (measured at 25° C. in $CH_2Cl_2$, c=5 g of polycarbonate/l of solution).

TABLE 1

| | Polymer blends I | | | | | | | | Properties | | |
| --- | --- | --- | --- | --- | --- | --- | --- | --- | --- | --- | --- |
| | Composition of polymer blend (parts by weight) | | | | | | | | | | |
| Example | PC-BP4B | PC-BP40 | PC-BP35DM | PC-BPA | PCSI-BPA | APEC35 | PA-AM | PST | Vicat B °C. | $a_k$ kJ/m² | Comments |
| 7 | 50 | | | 50 | | | | | 183 | 12 | F |
| 8 | | 50 | | 50 | | | | | 160 | 18 | FF |
| 9 | | | 30 | | | 70 | | | 185 | 29 | F |
| 10 | | 70 | | | | | 30 | | 157 | 8 | FF/B |

TABLE 1-continued

| | Polymer blends I | | | | | | | | Properties | | |
|---|---|---|---|---|---|---|---|---|---|---|---|
| | Composition of polymer blend (parts by weight) | | | | | | | | Vicat B | $a_k$ | |
| Example | PC-BP4B | PC-BP40 | PC-BP35DM | PC-BPA | PCSI-BPA | APEC35 | PA-AM | PST | °C. | kJ/m² | Comments |
| 11 | | | | 95 | | | | 5 | 223 | 8 | F |

Vicat B (°C.) = Vicat softening temperature VST/B/120 according to ISO 306 DIN 53,460 on standard small bar
$a_k$ = Impact strength at 23° C. according to ISO 179 DIN 53,453 on standard small bar
F = Good melt flow
FF = Particularly good melt flow
B = Benzine-resistant (80 × 10 × 4 mm rod, stored for 5 min at 25° C. in toluene/isooctane mixture, 1:1 parts by weight, with 0.6% extreme fibre elongation), that is to say without cracks in the test specimens after storage.

TABLE 2

| | Polymer blends II | | | | | | | | | | | Properties | | |
|---|---|---|---|---|---|---|---|---|---|---|---|---|---|---|
| | Composition of polymer blend (parts by weight) | | | | | | | | | | | | | |
| Example | PC-BP4B | PC-BP4B-BPA | PC-BP35DM-BPA | PC-BPA | PCSI-BPA | PBT | PPS | PUR | SEBS | PB-MMA | AC-MMA | Vicat B °C. | $a_k$ kJ/m² | Comments |
| 12 | 48 | | | | 48 | | | | 4 | | | 181 | 17 | B, F |
| 13 | | 35 | | 35 | | | 20 | | | 10 | | 159 | 27 | B, FF |
| 14 | | | 55 | | | 30 | | | | | 15 | 153 | 18 | B, FF |
| 15 | 55 | | | | | | | 30 | | | 15 | 222 | 10 | B, F |

Vicat B (°C.) = Vicat softening temperature VST/B/120 according to ISO 306 DIN 53,460 on standard small bar
$a_k$ = Impact strength at 23° C. according to ISO 179 DIN 53,453 on standard small bar
F = Good melt flow
FF = Particularly good melt flow
B = Benzine-resistant (80 × 10 × 4 mm rod, stored for 5 min at 25° C. in toluene/isooctane mixture, 1:1 parts by weight, with 0.6% extreme fibre elongation), that is to say without cracks in the test specimens after storage.

TABLE 3

| | Polymer blends III | | | | | | | Properties | | |
|---|---|---|---|---|---|---|---|---|---|---|
| | Composition of polymer blend (parts by weight) | | | | | | | | | |
| Example | PC-BP4B | PC-BP35DM-BPA | PC-BP40 | PB-MMA | PB-SAN | AC-MMA | AC-SAN | Vicat B °C. | $a_k$ kJ/m² | Comments |
| 16 | 75 | | | 25 | | | | 201 | 24 | B |
| 17 | | 80 | | | 20 | | | 181 | 27 | B, F |
| 18 | | | 80 | | | 20 | | 161 | 23 | B, FF |
| 19 | 85 | | | | | | 15 | 210 | 17 | B |

Vicat B (°C.) = Vicat softening temperature VST/B/120 according to ISO 306 DIN 53,460 on standard small bar
$a_k$ = Impact strength at 23° C. according to ISO 179 DIN 53,453 on standard small bar
F = Good melt flow
FF = Particularly good melt flow
B = Benzine-resistant (80 × 10 × 4 mm rod, stored for 5 min at 25° C. in toluene/isooctane mixture, 1:1 parts by weight, with 0.6% extreme fibre elongation), that is to say without cracks in the test specimens after storage.

We claim:
1. Thermoplastic blends of
A) 1 to 99% by weight of at least one thermoplastic aromatic polycarbonate which contains difunctional carbonate structural units of the formula (I)

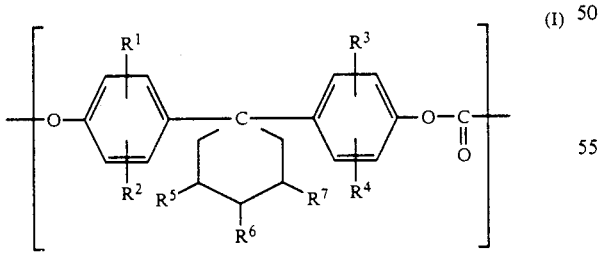

in which $R^1$, $R^2$, $R^3$ and $R^4$ independently of one another are hydrogen, a $C_1$-$C_{12}$-hydrocarbon radical or halogen and $R^5$, $R^6$ and $R^7$ independently of one another are H or a hydrocarbon radical, with the proviso that at least one of the radicals $R^5$, $R^6$ or $R^7$ is a hydrocarbon radical, that, when only one of the radicals $R^5$, $R^6$ or $R^7$ is present as a hydrocarbon radical the latter is a $C_3$-$C_{12}$-hydrocarbon radical, except for $C_3$-$C_{12}$-n-alkyl, and that, when two or three radicals $R^5$, $R^6$ and $R^7$ are present as hydrocarbon radicals, the latter are any $C_1$-$C_{12}$-hydrocarbon radicals, in amounts of 100 to 1 mol %, based on the total amount of difunctional carbonate structural units in the polycarbonate,
B) 0 to 99% by weight of at least one amorphous thermoplastic which differs from (A) and has a glass transition temperature of 40° to 300° C.,
C) 0 to 99% by weight of at least one partly crystalline thermoplastic having a melting point of 60° to 400° C.,
D) 0 to 99% by weight of at least one rubber,
E) 0 to 99% by weight of at least one graft polymer of at least one rubber with at least one grafted polymer of at least one monomer from the group consisting of the vinyl compounds, acrylic and methacrylic compounds and maleic acid derivatives,
in which the sum of A), B), C), D) and E) is 100% by weight.

* * * * *